United States Patent

Drenckhahn et al.

(10) Patent No.: US 9,054,366 B2
(45) Date of Patent: Jun. 9, 2015

(54) ELECTRICAL ENERGY STORAGE DEVICE

(75) Inventors: Wolfgang Drenckhahn, Erlangen (DE);
Harald Landes, Rückersdorf (DE);
Wolfgang Menapace, Erlangen (DE);
Shailesh D. Vora, Monroeville, PA (US);
Nicolas Vortmeyer, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 765 days.

(21) Appl. No.: 12/953,507

(22) Filed: Nov. 24, 2010

(65) Prior Publication Data

US 2012/0129039 A1 May 24, 2012

(51) Int. Cl.

| | |
|---|---|
| H01M 4/13 | (2010.01) |
| H01M 4/36 | (2006.01) |
| H01M 4/38 | (2006.01) |
| H01M 4/48 | (2010.01) |
| H01M 4/02 | (2006.01) |
| H01M 8/18 | (2006.01) |
| H01M 8/20 | (2006.01) |
| H01M 12/08 | (2006.01) |

(Continued)

(52) U.S. Cl.
CPC *H01M 8/18* (2013.01); *H01M 8/20* (2013.01); *H01M 12/08* (2013.01); *H01M 14/00* (2013.01); *H01M 2008/1293* (2013.01); *H01M 2300/0071* (2013.01); *Y02E 60/528* (2013.01); *Y02E 60/525* (2013.01)

(58) Field of Classification Search
CPC .......... H01M 12/08; H01M 14/00; H01M 2008/1293; H01M 2300/0071; H01M 8/18; H01M 8/20; Y02E 60/525; Y02E 60/528

USPC .......... 429/465, 479, 484, 485, 488, 489, 429/491–497, 523, 528, 304, 209, 218.1, 429/225, 228, 236

See application file for complete search history.

(56) References Cited

U.S. PATENT DOCUMENTS

| | | |
|---|---|---|
| 3,977,901 A | 8/1976 | Buzzelli |
| 4,054,729 A | 10/1977 | Isenberg |
| 4,078,125 A | 3/1978 | Brown |

(Continued)

FOREIGN PATENT DOCUMENTS

| | | |
|---|---|---|
| WO | WO 03001617 A2 | 1/2003 |
| WO | WO 2007137401 A1 | 12/2007 |

OTHER PUBLICATIONS

Minh, Ceramic Fuel Cells, J.Am Ceramic Soc., 1993, pp. 563-588, vol. 76.

*Primary Examiner* — Carlos Barcena

(57) ABSTRACT

An electrical energy storage device is provided which comprises at least one module with a negative electrode, a positive electrode made from an anion generating material or material combination and conducting anions, and an anion conducting solid electrolyte located between the negative electrode and the positive electrode. The negative electrode of each module comprises a porous structure that conducts anions and the pore space of which is at least partially filled by a first redox mass which comprises a metal/metal oxide pair. The positive electrode of each module comprises a porous structure that conducts anions and the pore space of which is at least partially filled by a second redox mass which comprises a metal/metal oxide pair with an increased oxidation potential compared to the first redox mass.

12 Claims, 7 Drawing Sheets

(51) Int. Cl.
*H01M 14/00* (2006.01)
*H01M 8/12* (2006.01)

(56) References Cited

U.S. PATENT DOCUMENTS

| | | | |
|---|---|---|---|
| 4,395,468 A | 7/1983 | Isenberg | |
| 4,728,584 A | 3/1988 | Isenberg | |
| 5,856,047 A | 1/1999 | Venkatesan et al. | |
| 6,399,247 B1 | 6/2002 | Kitayama et al. | |
| 7,261,970 B2 | 8/2007 | Young et al. | |
| 7,396,612 B2 | 7/2008 | Ohata et al. | |
| 2002/0187394 A1* | 12/2002 | Ovhsinsky et al. | 429/218.1 |
| 2003/0143457 A1 | 7/2003 | Kashino et al. | |
| 2004/0241537 A1 | 12/2004 | Okuyama et al. | |
| 2006/0063051 A1 | 3/2006 | Jang | |
| 2006/0204829 A1 | 9/2006 | Corrigan | |
| 2006/0204830 A1 | 9/2006 | Corrigan | |
| 2007/0077491 A1 | 4/2007 | Burchardt | |
| 2007/0104992 A1* | 5/2007 | Tsai et al. | 429/32 |
| 2007/0259234 A1 | 11/2007 | Chua et al. | |
| 2008/0003478 A1 | 1/2008 | Greiner et al. | |
| 2012/0077095 A1* | 3/2012 | Roumi et al. | 429/405 |

\* cited by examiner

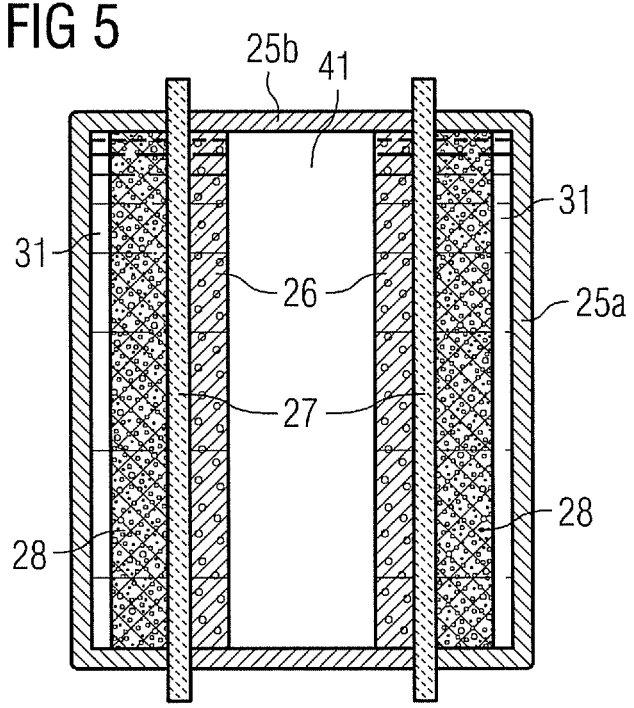
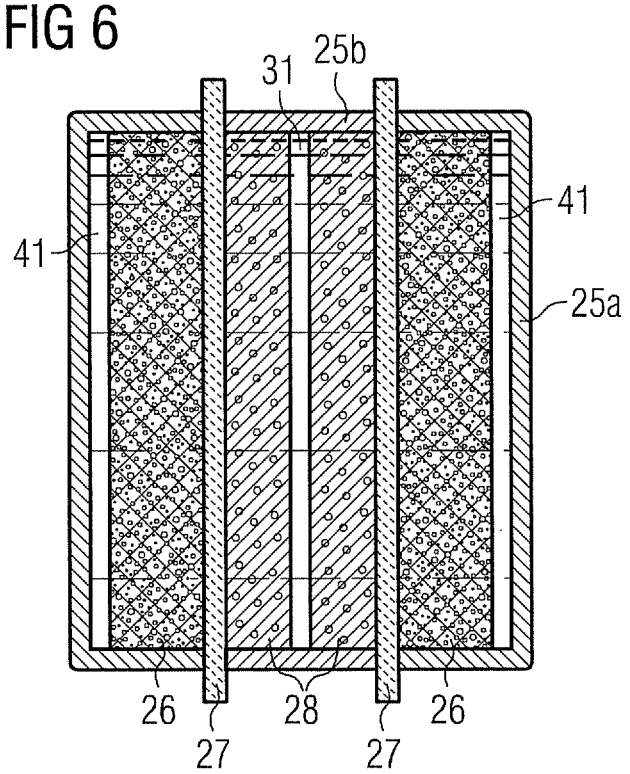

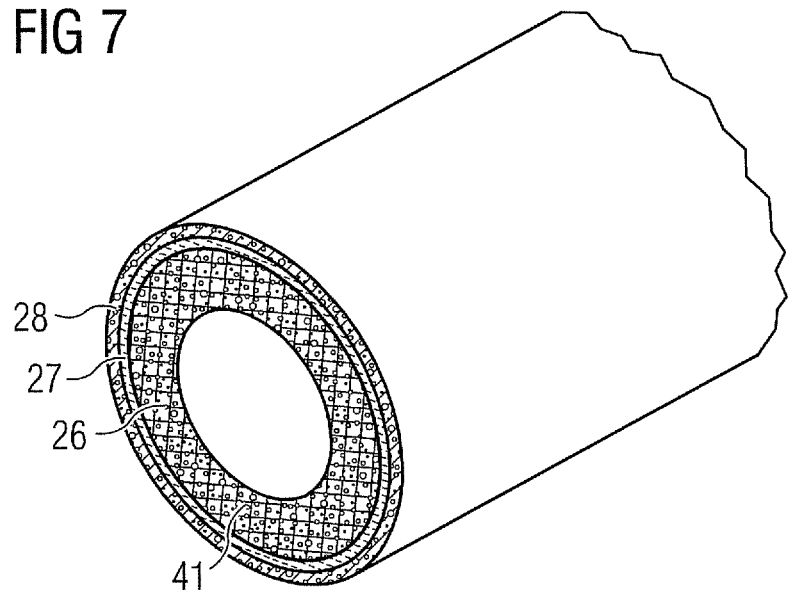
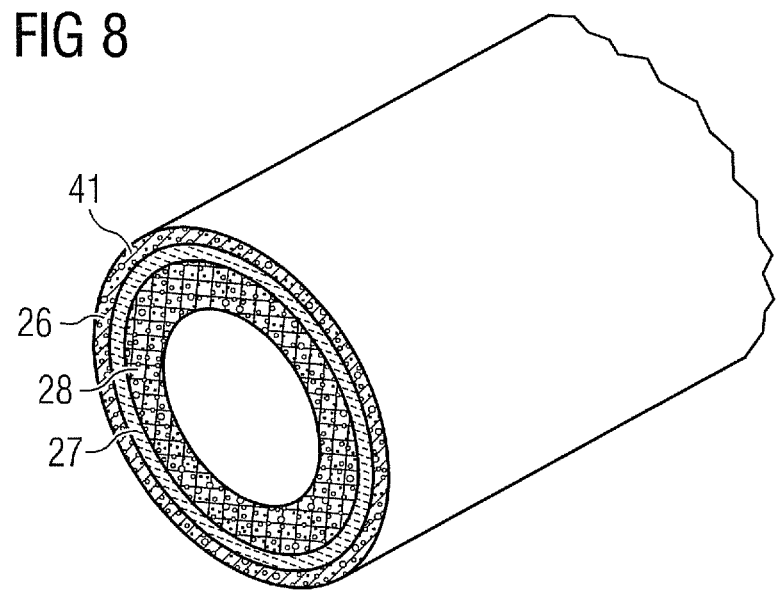

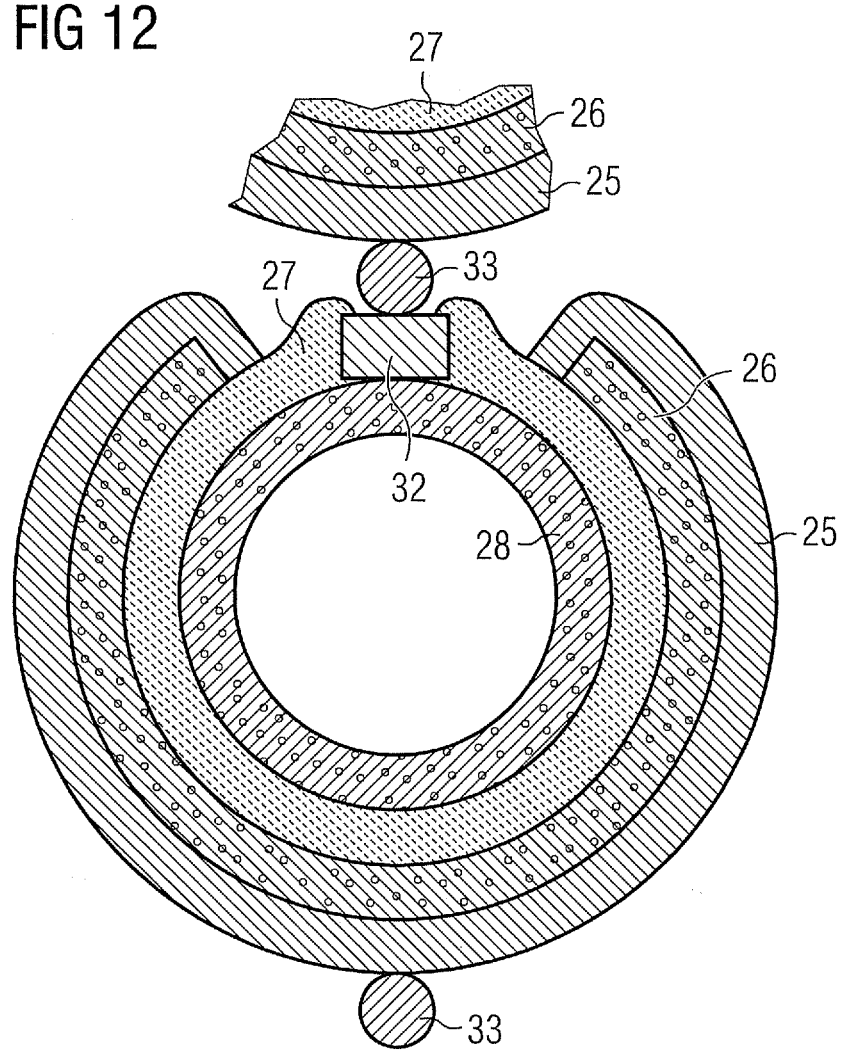

ELECTRICAL ENERGY STORAGE DEVICE

FIELD OF THE INVENTION

The present invention relates to an electrical energy storage device comprising at least one module with a negative electrode, a positive electrode, and an anion conducting electrolyte located between the negative electrode and the positive electrode.

BACKGROUND OF THE INVENTION

High temperature solid oxide electrolyte fuel cells are well known in the art and convert chemical energy into direct current electrical energy, typically at temperatures above about 500° C. This temperature is required to render the solid electrolyte sufficiently conductive. Stabilized zirconia is a prime electrolyte. Such fuel cells are taught, for example, by U.S. Pat. No. 4,395,468 (Isenberg). The general working principles and general reactions of a solid oxide fuel cell ("SOFC") are shown in prior art FIG. 1, which is self-explanatory. Air and a required gaseous fuel, such as natural gas, are both utilized solely to generate electricity at about 800° C. to about 1,000° C. This type SOFC utilizes metal/ceramic fuel electrodes 10, gaseous reformed natural gas fuel and ceramic, dense solid electrolyte 11 and porous ceramic air electrode 12. Fuel 13 is shown by F and oxidant or air A is shown by 14.

An encyclopaedic publication by N. Q. Minh, in Ceramic Fuel Cells, *J. Am. Ceramic Soc.*, 76[3] 563-588, 1993 describes in detail a variety of fuel cell designs, including tubular, triangular and other configurations, as well as materials used and accompanying electrochemical reactions. For example, that article describes segmented cell-in-series (banded and bell-and-spigot), monolithic (co-flow and cross-flow), and flat-plate designs in substantial detail. Cermet fuel electrode (anode) materials, such as nickel or cobalt/yttria stabilized zirconia are also discussed as well as their coefficient of thermal expansion problems.

In addition to generating energy, batteries also store it. Electrical energy storage is crucial for the effective proliferation of an electrical economy and for the implementation of many renewable energy technologies. During the past two decades, the demand for the storage of electrical energy has increased significantly in the areas of portable, transportation, and load-levelling and central backup applications. The present electrochemical energy storage systems are simply too costly to penetrate major new markets, still higher performance is required, and environmentally acceptable materials are preferred. Transformational changes in electrical energy storage science and technology are in great demand to allow higher and faster energy storage at the lower cost and longer lifetime necessary for major market enlargement. Most of these changes require new materials and/or innovative concepts with demonstration of larger redox capacities that react more rapidly and reversibly with cations and/or anions.

Batteries are by far the most common form of storing electrical energy, ranging from: standard every day lead—acid cells, exotic iron-silver batteries for nuclear submarines taught by Brown in U.S. Pat. No. 4,078,125 and nickel-metal hydride (NiMH) batteries taught by Venkatesan et al. in U.S. Pat. No. 5,856,047, Kitayama in U.S. Pat. No. 6,399,247 B1 and Young et al. in U.S. Pat. No. 7,261,970. Also known are metal-air cells taught in U.S. Pat. No. 3,977,901 (Buzzelli), Isenberg in U.S. Pat. No. 4,054,729, U.S. Patent Publications 2006/0063051; 2007/0077491; 2007/0259234 (Jang, Burchardt and Chua et al, respectively) and air batteries also taught in U.S. Patent Publications 2003/0143457 and 2004/0241537 (Kashino et al. and Okuyama et al., respectively). Lithium-ion batteries are taught by Ohata in U.S. Pat. No. 7,396,612 B2.

Batteries range in size from button cells used in watches, to megawatt load levelling applications. They are, in general, efficient storage devices, with output energy typically exceeding 90% of input energy, except at the highest power densities. Rechargeable batteries have evolved over the years from lead-acid through nickelcadmium and nickel-metal hydride (NiMH) to lithium-ion. NiMH batteries were the initial workhorse for electronic devices such as computers and cell phones, but they have almost been completely displaced from that market by lithium-ion batteries because of the latter's higher energy storage capacity. Today, NiMH technology is the principal battery used in hybrid electric vehicles, but it is likely to be displaced by the higher power energy and now lower cost lithium batteries, if the latter's safety and lifetime can be improved. Of the advanced batteries, lithium-ion is the dominant power source for most rechargeable electronic devices.

SUMMARY OF THE INVENTION

With respect to the mentioned prior art it is an objective of the present invention to provide an advantageous electrical energy storage device that can easily discharge and charge a high capacity of energy quickly and reversibly, as needed.

This objective is solved by an electrical energy storing device as claimed in the independent claim. The depending claims define further developments of the invention.

An inventive electrical energy storage device comprises at least one module with a negative electrode, a positive electrode made from an anion generating material, or material combination, that conduct anions and electrons, and an anion conducting solid electrolyte located between the negative electrode and the positive electrode. The negative electrode of each module comprises a porous structure, typically a porous ceramic structure that conducts anions. The pores of the porous structure are at least partially filled by a first redox mass of a redox pair, which comprises a metal and its oxide or two different oxides of the metal. The negative electrode of each module comprises a porous structure, typically a porous ceramic structure that conducts anions. The pores of the porous structure are at least partially filled by a second redox mass of a redox pair, which comprises a metal and its oxide or two different oxides of the metal in a state with an increased oxidation potential of the species the electrolyte is conducting via anions compared to the first redox mass of a redox pair. Preferably the porous ceramic structure also conducts electrons.

The first redox mass and the second redox mass may comprise the same metal in different pairs of oxidation states. Alternatively or additionally, the first redox mass may comprise a first metal/metal oxide pair and the second redox mass may comprise a second metal/metal oxide pair with a different oxidation potential compared with the first metal/metal oxide pair.

The porous structure of the negative electrode can be infiltrated by the first redox mass. The porous structure of the second electrode can be infiltrated by the second redox mass. In case of infiltration the porous structure may comprise an outwards open pore system. The mass can be solid or liquid under operating conditions.

Such an electrical energy storage device can easily be discharged by oxidising the metal or its oxide of the redox mass and charged by applying a voltage between the negative electrode and the positive electrode that leads to reduction of the oxidised metal or its higher oxide in the redox mass.

In particular, the metal in said oxidised state can be an oxide of the metal, i.e. an oxygen compound of said metal. Note, that in a more general sense, the metal in the oxidised state may be represented by other compounds in which the metal donates one or more electrons to another element of the compound. For example, an element of the halogen group could be used for oxidising the metal so that a metal halogenide compound would be formed. However, oxygen is a preferred element for oxidising the metal in the first and/or second mass since oxygen is easily available from air.

Typically, in a storage battery with oxygen conducting oxide ceramic electrolyte where the positive electrode is supplied with air the redox system MeOx/MeOx+y acting as storage medium at the negative electrode determines the storage volume at this electrode for a predefined capacity. Thereby it has to be considered that at an insufficient conductivity of the material, i.e. ionic and electronic conductivity, an additional conductive structure is needed. This additional conductive structure must be incorporated into the storage material and may affect the total volume of the negative electrode. If the positive electrode must be supplied with oxygen for the oxidation by means of an air fan, an extensive and costly flow and heat management of the energy storage system is necessary at a working temperature between 600° C. and 800° C.

The present invention avoids the need of such an extensive and costly flow and heat management by introducing a storage medium Me'Ox'/Me'Ox'+y' in form of a redox system at the positive electrode as well. The storage medium Me'Ox'/Me'Ox'+y' at the positive electrode is characterised by an increased or higher oxygen potential compared with the redox system at the negative electrode MeOx/MeOx+y. The storage medium Me'Ox'/Me'Ox'+y' at the positive electrode emits oxygen in the form of oxygen ions ($O^{2-}$) which flow from the positive electrode via the electrolyte to the negative electrode during the discharging process and can be absorbed in the positive electrode again during the charging process.

In the present invention the positive electrode has a similar porous structure, preferably ceramic structure, as the negative electrode has. The positive electrode can comprise a redox system based on the same metal as the negative electrode but at a different pair of oxidation states. Alternatively, the positive electrode can comprise a redox system based on a different metal than the anode Me'Ox''/Me'Ox''' with a different oxidation potential. Thus, the oxygen which is emitted from the negative electrode can directly be absorbed from the positive electrode during charging and vice versa can flow from the positive to the negative electrode during discharging.

The first and/or second redox mass is preferably liquid at temperatures above 500° C., in particular at temperatures between 600° C. and 800° C. At these temperatures, high ion transport capacities of the solid electrolyte and the porous ceramic structures of the positive electrode and the negative electrode can be achieved.

In a special implementation of the first and/or second redox mass the metal as such is liquid at temperatures below 800° C. Metals fulfilling this condition are, e.g. tin, lead and bismuth.

In a different implementation, in which the metal is not itself liquid at temperature below 800° C. the first and/or second redox mass can comprise a molten salt of said metal comprised in the first and/or second redox mass. By this measure, a mixture of the metal and the metal salt can be achieved that is liquid or at least malleable even at temperatures at which the metal itself would not be liquid. The molten salt can, for example, comprise halogens as an anion, for example chlorine. In this case, the first and/or second redox mass may be formed by a mixture given by the formula:

Suitable metals which are liquid in a liquid mass comprising a salt of the respective metal, in particular of the form $MeCl_x$, are iron, manganese or nickel. Those amounts of the metal which are not bound in the salt compound are then available for the electrochemical redoxreaction.

A suitable geometrical configuration of the at least one module is a tubular configuration in which the module extends along a longitudinal axis and has a circular cross section with the positive electrode at the inside of the circle and the negative electrode at the outside of the circle. The module may further comprise container for the first and for the second redox mass in case these are liquids. Alternatively, in the tubular configuration, the positive electrode can be at the outside of the tubular module. The negative electrode is then located inside of the tubular module.

Other configurations of the at least one module of the electrical energy storage device are possible as well. For example, flat configurations in which a number of flat modules can be stacked and in which each module comprises a layer stack with a positive electrode, a negative electrode and an electrolyte located between the positive electrode and the negative electrode.

To increase the voltage produced by the electrical energy storage device at least two modules can be connected in series. Similarly, to increase the current of the electrical energy storage device at lest two modules can be connected in parallel. Connecting modules in parallel and in series is also possible.

Generally, by providing the positive electrode and the negative electrode with a porous structure, typically a porous ceramic structure, which comprises a metal in a non-oxidised and/or in an oxidised state in different oxidation states at the positive electrode and the negative electrode a costly and extensive air supply at the electrodes, especially at the positive electrode, can be avoided. This reduces the own energy consumption and simplifies the heat management means of the energy storage device.

BRIEF DESCRIPTION OF THE DRAWINGS

Further features, properties and advantages of the present invention will become clear from the following description of embodiments in conjunction with the accompanying drawings. The mentioned features are advantageous separately or in any combination with each other. The dimensions of the objects in the figures have been chosen for the sake of clarity and do not necessarily reflect the actual relative dimensions.

FIG. 5 schematically shows a typical tubular configuration of the electrical energy storage device with an inner positive electrode in a sectional view along the longitudinal direction of the cell;

FIG. 6 schematically shows a typical tubular configuration of the electrical energy storage device with an outer positive electrode in a sectional view along the longitudinal direction of the cell;

FIG. 7 perceptively shows a typical tubular configuration of the electrical energy storage device with an inner positive electrode in a sectional view along the radial direction of the cell;

FIG. 8 perceptively shows a further typical tubular configuration of the electrical energy storage device with an outer cathode in a sectional view along the radial direction of the cell;

FIG. 12 schematically shows an example for the electrical contacting of a tubular cell of the electrical energy storage device as shown in FIG. 8 in a sectional view.

DETAILED DESCRIPTION OF THE INVENTION

Figure 1:
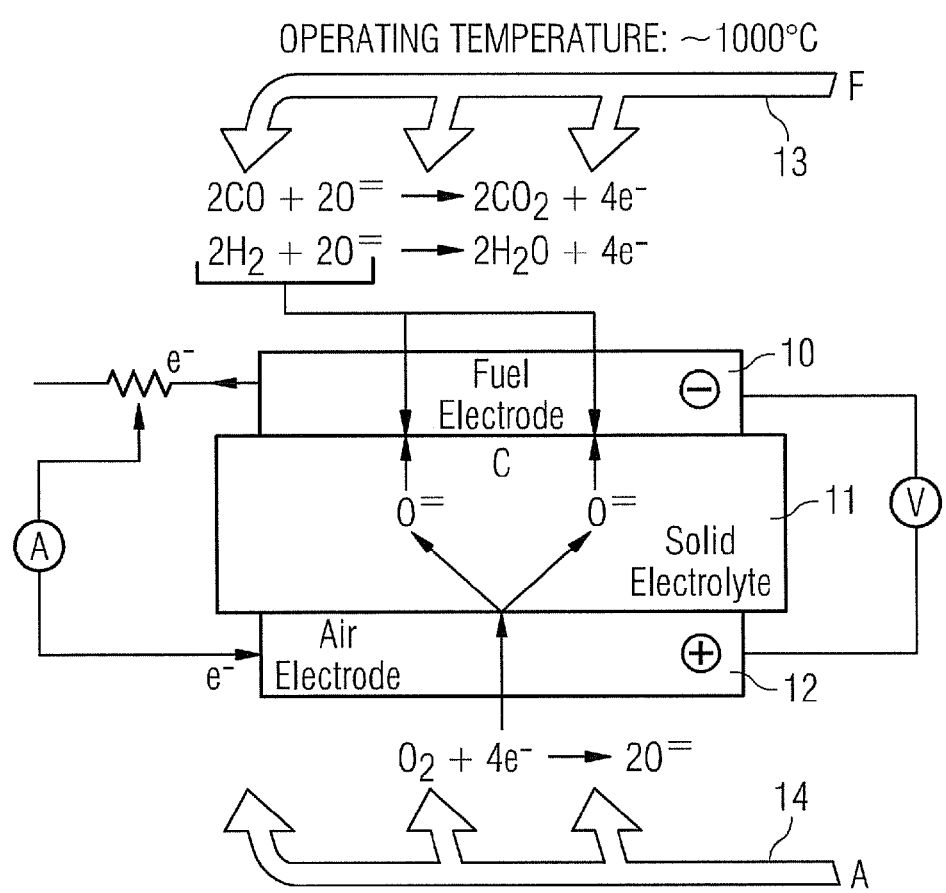
FIG. 1 illustrates the working principals of prior art SOFC's.
Figure 2:
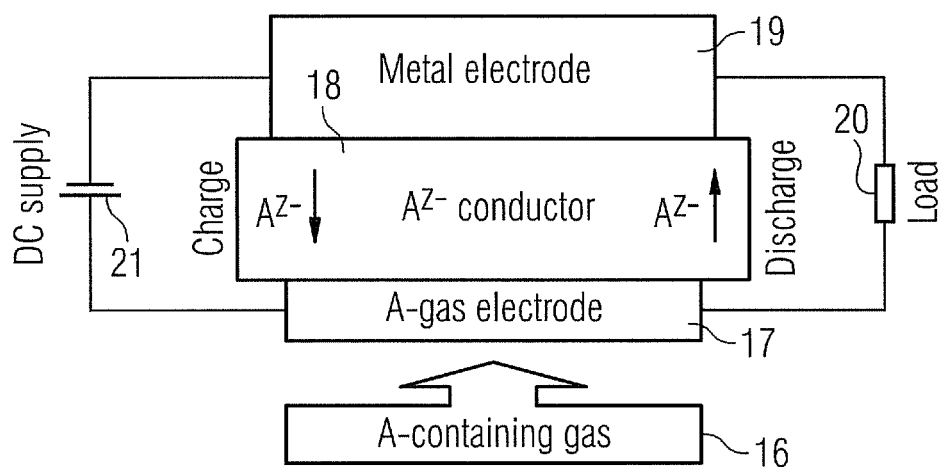
FIG. 2 illustrates the broadest example of the energy storage device of this invention based on an anion A conductor which utilizes A-containing gas and eliminates the need for gaseous fuel.

The broadest working principle of the electrical storage device of this invention is shown in FIG. 2. A non-fuel containing gas 16 which contains an anion forming element or compound A contacts an A-gas electrode 17 made from a material or material composition that generates and conducts anions from the element or compound A and electrons. An anion $A^{z-}$ conducting conductor/electrolyte 18 is disposed next to the A-gas electrode and an electron or anions conducting electrode 19. Furthermore, there is an electrical circuit, a load 20 and a DC supply 21. Here, there is an anion $A^{z-}$ conducting electrolyte where there is ion transfer between electrodes on either side of the electrolyte, such ions are selected from at least one of $O^{2-}$, $CO_3^{2-}$ and $PO_4^{3-}$.

Figure 3:
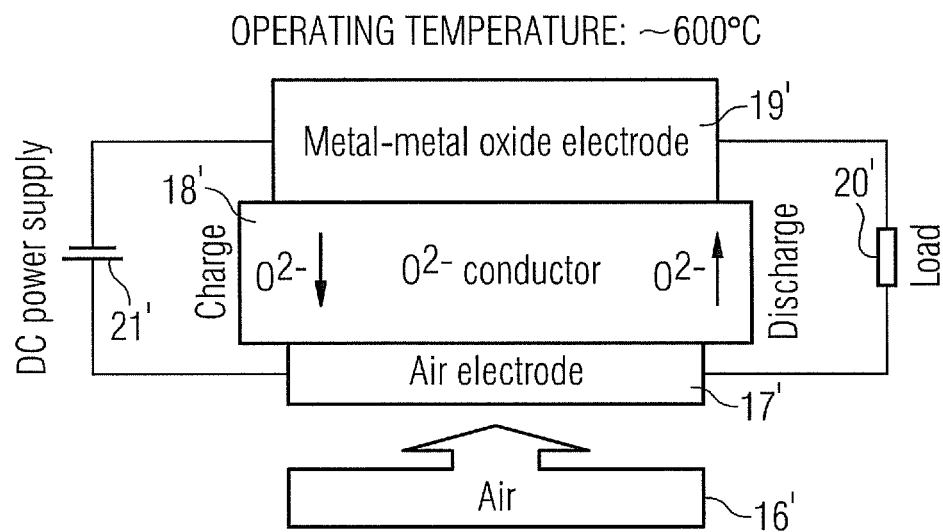
FIG. 3 illustrates the working principals of one embodiment of the electrical energy storage device of this invention, which utilizes air and eliminates the need for gaseous fuel.
Figure 4:
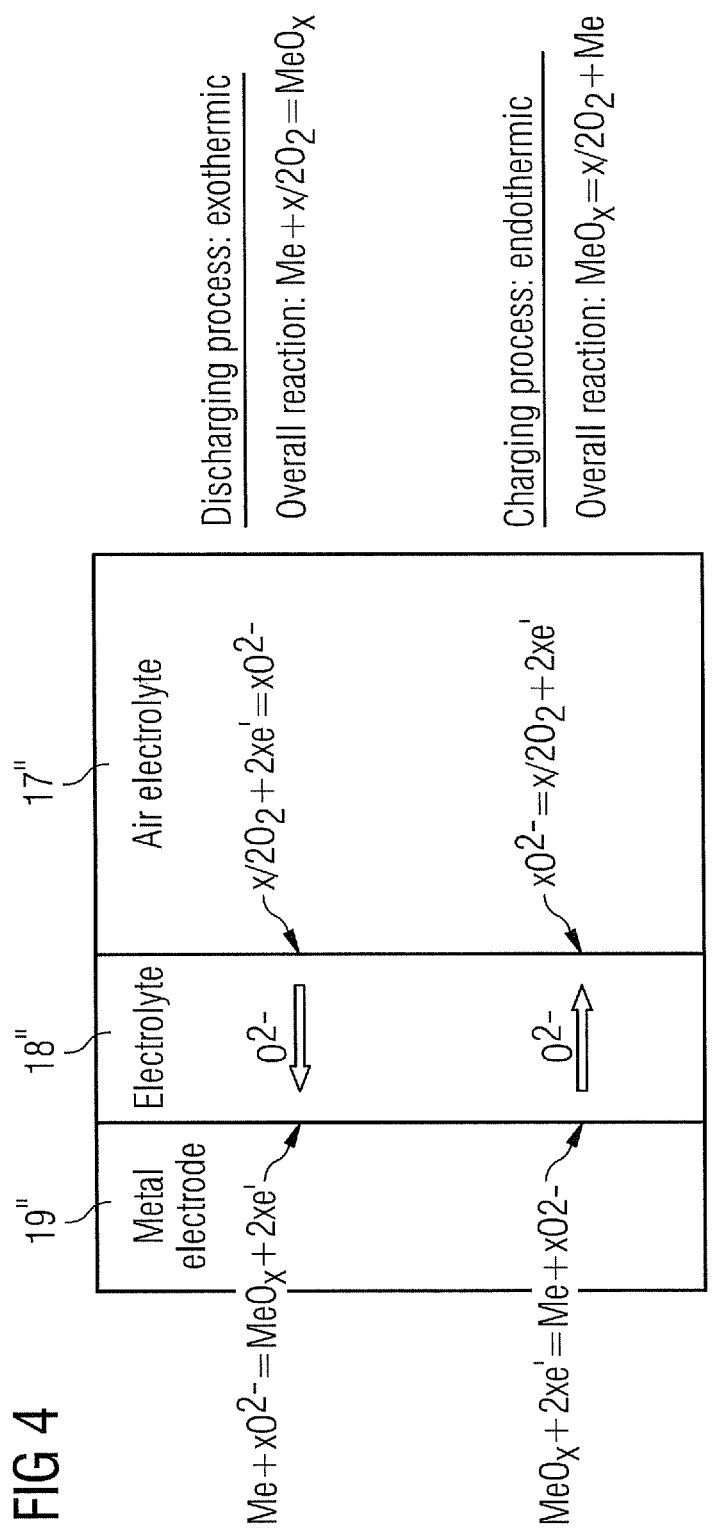
FIG. 4 illustrates an example of both electrode reactions of the electrical energy storage device of this invention.

The working principle of one embodiment of the electrical storage device of this invention is schematically shown in FIG. 3. In this embodiment, the A-gas is air with oxygen (O) as the anion forming element. Hence, FIG. 3 shows an oxide-ion battery configuration. In discharge mode, oxide-ion anions migrate from high partial pressure of oxygen side (air side in this case) to low partial pressure of oxygen side (metal-metal oxide electrode) under the driving force of a gradient of the oxygen chemical potential. In charge mode, the oxide-ions are forced to migrate from low partial pressure of oxygen side to high partial pressure of oxygen side under the driving force of an electrical field. Here, air 16' is in contact with air electrode (positive electrode) 17'. Oxygen ion conductor electrolyte is between the air electrode and metallic (metal-metal oxide) electrode (negative electrode) 19'. Load is shown as 20', and D.C. power supply 21'. The corresponding electrode reactions occurring during charge and discharge course are illustrated in FIG. 4. Under the discharge mode the metal of the anode is oxidized into metal oxide with exothermic heat whereas under the charge mode metal oxide of the anode is reduced into metal with endothermic heat. The discharging process is, where Me stand for metal:

and the charging process is:

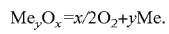

Here, air electrode is shown as 17", electrolyte as 18" and metal electrode as 19".

Tubular cell configurations are preferred and will be illustrated throughout this specification for simplicity reasons. However, this should not be construed in any way as restrictive, as other "hollow, elongated tubular cell" structures are herein included, as are described by Isenberg, in U.S. Pat. No. 4,728,584—a corrugated design, and by U.S. Patent Application Publication No. U.S. 2008/0003478 A1 (Greiner et al.)—a triangular, quadrilateral, oval, stepped triangle and meander, are all herein defined as "hollow elongated tubular" cells.

Figure 9:
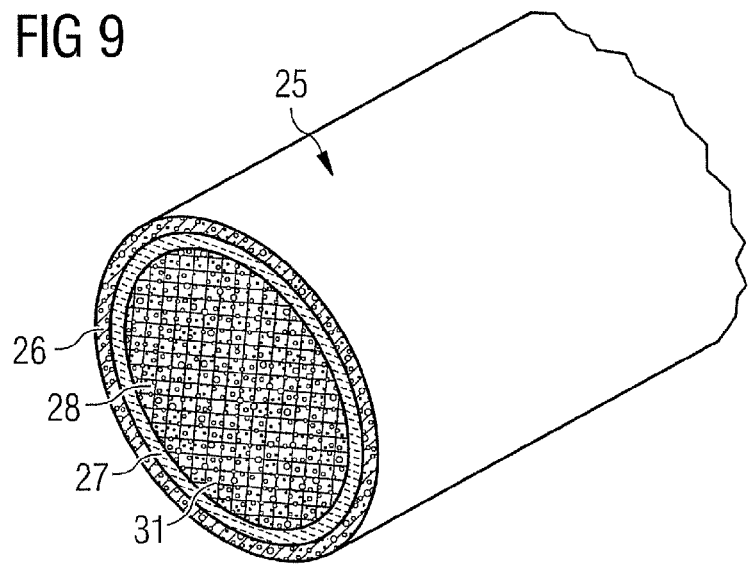
FIG. 9 perceptively shows a typical tubular configuration of the electrical energy storage device with an outer positive electrode in a sectional view along the radial direction of the cell.

Typical tubular cell configurations are schematically displayed in FIGS. 5 to 9 in sectional views along the longitudinal direction (FIGS. 5 and 6) and perspective views in a section along the radial direction (FIGS. 7 to 9).

The cell configurations comprise at least three functional layers: a positive electrode 26, a solid electrolyte 27 and a negative electrode 28. While FIGS. 5 and 7 show cell configurations with an inner positive electrode 26, FIGS. 6, 8 and 9 show cell configurations with an outer positive electrode 26. In FIGS. 5, 6, 9, 11 and 12 an outer casing 25 forming a container is shown. In the examples shown in FIGS. 5, 6 and 11 the outer casing 25 comprises two casing portions 25a and 25b.

In the cell configurations with the outer positive electrode 26, as shown in FIGS. 6, 8 and 9, the negative electrode 28 may be in the form of a structure forming the centre of the cell. The negative electrode 28 can have circular, square, irregular or any other cross-section, thus the term structure as used herein shall not be restricted to circular cross-sections as they are shown in FIGS. 6, 8 and 9. The negative electrode 28 then forms a substrate for the electrolyte 27 and the positive electrode 26 that are sequentially deposited on the negative electrode 28.

In the cell configurations with the inner positive electrode 26, as shown in FIGS. 5 and 7, the positive electrode 26 may be in the form of a structure forming the centre of the cell. The positive electrode 26 can have circular, square, irregular or any other cross-section, thus the term structure as used herein shall not be restricted to circular cross-sections as they are shown in FIGS. 5 and 7. The positive electrode 26 then forms a substrate for the electrolyte 27 and the negative electrode 28 that are sequentially deposited on the positive electrode 26.

The electrolyte layer 27 is a dense ceramic membrane that transfers oxygen ions ($O^{2-}$) and can comprise, or consist of, a single ceramic phase that conducts anions but not electrons, e.g. a single phase of scandia stabilised zirconia. As an alternative, yttria stabilised zirconia or mixtures of scandia stabilised zirconia and yttria stabilised zirconia could be used instead of scandia stabilised zirconia. The electrolyte layer 27 is typically about 20 micrometers to 100 micrometers thick.

Important components of the cell of this invention are the negative electrode 28 and the positive electrode 26. Important criteria for the negative electrode 28 and the positive electrode are: thermodynamic EMF (electromotive force); theoretical energy density (MJoule/kg metal); thermodynamic electrical efficiency; cost ($/kWatt electrical hours eh) [e=electricity; h=hour]; maximum current density (determines performance); and maximum charge storage (ampere hour/cm$^2$).

According to the present invention, the negative electrode 28 and the positive electrode 26 are formed from a porous structure that conducts anions and, in the present embodiment, also electrons. The porous structure of the negative electrode 28 is partially filled by a first redox mass 31 which comprises a metal in a non-oxidised and/or in an oxidised state. The porous structure of the positive electrode 26 is partially filled by a second redox mass 41 which comprises a metal in a non-oxidised and/or in an oxidised state. The second redox mass comprises a metal in a non-oxidised and/or in an oxidised state with an increased oxidation potential compared with the metal of the first redox mass.

The first redox mass and the second redox mass may comprise the same metal in different pairs of oxidation states. Alternatively, the first redox mass may comprise a first metal and the second redox mass may comprise a second metal with a different oxidation potential compared with the first metal.

In the present invention a first storage medium MeOx/MeOx+y in form of a redox system is introduced at the negative electrode 28 and a second storage medium Me'Ox'/Me'Ox'+y' in form of a redox system is introduced at the positive electrode 26 as well. Me and Me' indicate two metals but which may also be the same. The storage medium MeOx'/MeOx'+y' at the positive electrode 26 is characterised by an increased or higher oxygen potential compared with the redox system at the negative electrode 28 MeOx/MeOx+y. The storage medium MeOx'/MeOx'+y' at the positive electrode 26 emits oxygen which flows from the positive electrode 26 to the negative electrode 28 where it is absorbed during the discharging process and flows back again during the charging process.

In the present invention the positive electrode 26 has a similar porous structure, preferably ceramic structure, as the negative electrode 28 has. The positive electrode 26 can comprise a redox system based on the same metal as the negative electrode 28 but at a different oxidation state. Alternatively, the positive electrode 26 can comprise a redox system based on a different metal than the negative electrode Me'Ox''/Me'Ox''' with a different oxidation potential. Thus, the oxygen which is emitted from the negative electrode 28 can directly be absorbed from the positive electrode 26 during charging and vice versa can flow from the positive electrode 26 to the negative electrode 28 during discharging.

The porous structure (skeleton) of the negative electrode 28 and/or the positive electrode 26 may be formed from a perovskite ($ABO_3$). In the present embodiment, the porous structure can be formed from a mixture of $LaCrO_3$ doped with Strontium (Sr) and/or Cobalt (Co) and Gadolinium-doped ceria (GDC). The fraction of GDC may vary from 30% to 70%. Preferably, the porous structure is formed from a mixture that consist of 50% by volume doped $LaCrO_3$ and 50% by volume GDC. A technique available to form a fine porous structure (also called skeleton) is, for example, plasma spraying to form a well-adhered fine structured mixed electrical conducting skeleton.

The porous ceramic structure of the positive electrode 26 and/or the negative electrode 28 can be infiltrated with a redox mass 41, 31 that is liquid at temperatures above 500° C., in particular at temperatures between 600° C. and 800° C.

In a first embodiment of the first or second redox mass, the mass is formed by liquid tin/tin oxide ($Sn/SnO_x$). However, other metals that are liquid at temperatures below 800° C. like, for example, lead (Pb), bismuth (Bi) and thallium (Tl) can also be used in their oxidised and/or non-oxidised form. The liquid metal in the oxidised and/or non-oxidised state infiltrates the porous structure which has a large surface. Hence, the metal/metal oxide has a large interface to the ion and electron leading porous ceramic structure, which allows a quick loading and a high current of the electrical energy storage device.

In an alternative embodiment of the first or second liquid infiltration mass, the mass is formed by a molten salt that comprises a metal in an oxidised and/or in a non-oxidised state together with a salt of this metal. The salt forming element can be a halogen, in particular chlorine (Cl). Such a redox mass can be represented by the formula

$$a\text{Me}-b\text{MeO}_x-\text{MeCl}_y.$$

The metal used in the molten salt is chosen such that the molten salt with the metal and/or the metal oxide is liquid at temperatures below 800° C., in particular in the temperature range between 600° C. and 800° C. In the present embodiment iron (Fe) is used as metal Me in the molten salt which fulfils the above conditions. An alternative element fulfilling these conditions would be nickel (Ni).

One or both of the two redox masses may be also solid under operating conditions of the cell.

Figure 10:
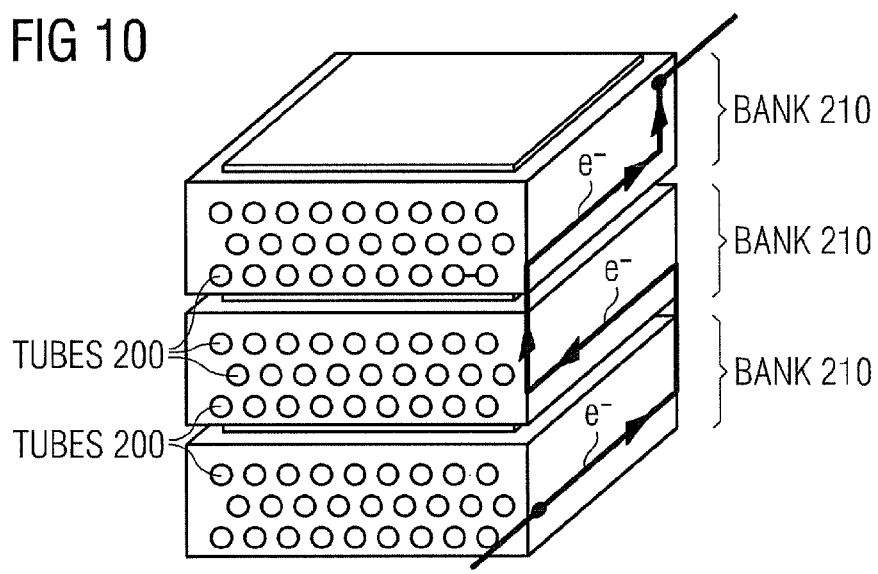
FIG. 10 shows an electrical energy storage device formed of three banks each comprising a number of tubular cell modules.

A cell as described above can itself form an electrical energy storage device. However, a cell can also be used as module in an electrical storage device. Two or more such modules can be connected in series to increase the available voltage or in parallel to increase the available current. In addition, it is possible to form banks, where each bank comprises at least two modules that are connected in parallel to increase the available current. An electrical energy storage device can then comprise two or more such banks that are connected in series to increase the available voltage. An electrical energy storage device formed of three banks 210 each comprising a number of tubular cells 200 as modules is shown in FIG. 10.

Generally the electrical contacting of a tubular cell is more difficult compared with a flat cell. Therefore, the flat configuration is advantageous.

FIG. 12 schematically shows an example for the electrical contacting of a tubular cell of the electrical energy storage device as shown in FIG. 8 in a sectional view. In FIG. 12 the electrolyte 27 and the positive electrode 26 only partially surround the circumference of the tubular negative electrode 28 to provide an electrical contacting of the negative electrode 28 via a gas tight, electronically conducting but anions blocking contacting means 32. A mechanically compliant and electronically conducting means 33 is placed between the contacting means 32 of the negative electrode 28 and the adjacent positive electrode 26.

There are many advantages presented by a bank of cells to provide a consolidated oxide-ion battery. The cell bank and module system can be much simplified. Since no gaseous fuels are used, the relevant subsystems of SOFC's, such as reformer, desulfurizer and depleted fuel recirculation loop can be eliminated, resulting in considerable cost reduction. In addition, common combustion of depleted fuel and vitiated air encountered in a SOFC is no longer present. Therefore, the system reliability is also greatly improved.

Figure 11:
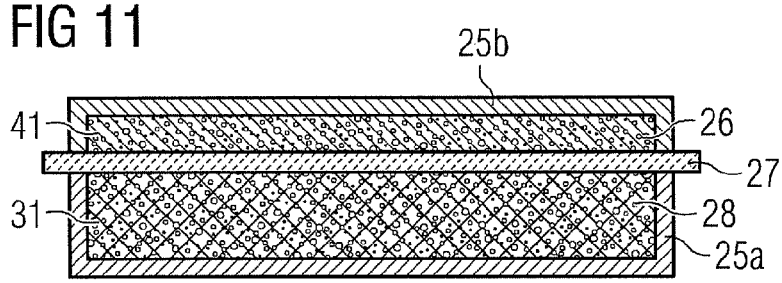
FIG. 11 schematically shows a typical flat configuration of the electrical energy storage device in a sectional view.

Up to now only a tubular configuration of the modules of the electrical energy storage device has been described. However, as already mentioned before other configurations are possible is well. For example, FIG. 11 shows a flat configuration in a schematic sectional view. The flat electrical energy storage device module of the present embodiment is formed from three layers stacked onto each other, namely a positive electrode 26, a negative electrode 28 and a solid electrolyte 27 located between the negative electrode 28 and the positive electrode 26 and separating them from each other.

What has been said with respect to the materials of the positive electrode 26, the electrolyte 27 and the negative electrode 28 in the tubular configuration is also valid in the embodiment shown in FIG. 11. In particular, the porous negative electrode 28 and the porous positive electrode 26 are partially filled by a redox mass as it has been described with respect to the tubular configuration.

It should be mentioned that FIG. 11 depicts only one example of a flat configuration. Modifications to the flat configuration shown in FIG. 11 are possible. For example, while the negative electrode 28 is the lowermost layer and the positive electrode 26 the uppermost layer of the layer stack shown in FIG. 11 it is also possible to have the negative electrode 28 as the uppermost layer and the positive electrode 26 as the lowermost layer.

Like with the tubular configuration the modules in the flat configuration can be connected in series and/or in parallel. Moreover, the modules of the flat configurations can be piled.

The invention described above provides for an electrical energy storage device that can easily discharge and charge a high capacity of energy quickly and reversibly, as needed. In addition, the electrical energy storage device is simple, can operate for years without major maintenance and does not need to operate on carbonaceous fuel gases such as natural gas fuel, hydrocarbon fuel or its reformed by-products such as $H_2$ fuel. Moreover, the invention allows for a simple cell and module structure with high theoretical energy density, low system cost, and low power-loss current collection in case of a flat configuration.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

The invention claimed is:

1. An electrical energy storage device, comprising:
a module comprising:
a negative electrode,
a positive electrode made from an anion generating material or material combination and conducting anions, and
an anion conducting solid electrolyte located between the negative electrode and the positive electrode,
wherein the negative electrode comprises a first porous structure that conducts the anions and pores in the first porous structure are at least partially filled by a first redox mass of a redox pair comprising a first metal and an oxide of the first metal or two different oxides of the first metal, and
wherein the positive electrode comprises a second porous structure that conducts the anions and pores in the second porous structure are at least partially filled by a second redox mass of a redox pair comprising a second metal and an oxide of the second metal or two different oxides of the second metal, the second redox mass with an increased oxidation potential compared to the first redox mass,
wherein the first redox mass comprises a molten salt of the first metal and/or the second redox mass comprises a molten salt of the second metal.

2. The electrical energy storage device as claimed in claim 1, wherein the first redox mass and/or the second redox mass is a liquid or solid redox mass.

3. The electrical energy storage device as claimed in claim 1, wherein the first redox mass is infiltrated in the pores of the first porous structure of the negative electrode and/or the second redox mass is infiltrated in the pores of the second porous structure of the positive electrode.

4. The electrical energy storage device as claimed in claim 1,
wherein the first metal and the second metal are the same metal in different oxidation states, and/or
wherein the first metal and the second metal are different metals having a different oxidation potential.

5. The electrical energy storage device as claimed in claim 1, wherein the first redox mass and/or the second redox mass is liquid at temperatures above 500° C.

6. The electrical energy storage device as claimed in claim 1, wherein the first metal and/or the second metal is selected from the group consisting of: tin, lead, and bismuth.

7. The electrical energy storage device as claimed in claim 1, wherein the molten salt of the first metal and/or the molten salt of the second metal comprises halogens as an anion.

8. The electrical energy storage device as claimed in claim 1, wherein the first redox mass and/or the second redox mass is formed by a mixture given by the formula $$a\text{Me-}b\text{MeO}_x\text{-MeCl}_y\text{---}$$

wherein Me stands for a metal, and a, b, x, and y stand for values satisfying the stoichiometry.

9. The electrical energy storage device as claimed in claim 8, wherein Me stands for iron, nickel or manganese.

10. The electrical energy storage device as claimed in claim 1,
wherein the module has a tubular configuration that extends along a longitudinal axis, and,
wherein the tubular configuration has a circular cross section with the positive electrode at an inside and the negative electrode at an outside or with the positive electrode at the outside and the negative electrode at the inside.

11. The electrical energy storage device as claimed in claim 1, wherein the module has a flat configuration with a layer stack comprising a positive electrode layer, a negative electrode layer and a solid electrolyte layer located between the positive electrode layer and the negative electrode layer.

12. The electrical energy storage device as claimed in claim 1, further comprising at least two modules connected in series or in parallel.

* * * * *